(12) United States Patent
Park et al.

(10) Patent No.: US 9,082,133 B2
(45) Date of Patent: Jul. 14, 2015

(54) ESTIMATING OFF-LINE ADVERTISING IMPRESSIONS

(71) Applicant: Google Inc., Mountain View, CA (US)

(72) Inventors: John B. Park, Irvine, CA (US); Chad E. Steelberg, Newport Beach, CA (US); Ryan S. Steelberg, Irvine, CA (US); Russell K. Ketchum, Newport Beach, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/777,880

(22) Filed: Feb. 26, 2013

(65) Prior Publication Data

US 2013/0173379 A1     Jul. 4, 2013

Related U.S. Application Data

(63) Continuation of application No. 12/102,790, filed on Apr. 14, 2008, now Pat. No. 8,386,311.

(60) Provisional application No. 60/911,781, filed on Apr. 13, 2007.

(51) Int. Cl.
  *G06Q 30/00*     (2012.01)
  *G06Q 30/02*     (2012.01)
  *H04H 60/31*     (2008.01)

(52) U.S. Cl.
  CPC .......... *G06Q 30/0242* (2013.01); *G06Q 30/02* (2013.01); *G06Q 30/0201* (2013.01); *G06Q 30/0205* (2013.01); *G06Q 30/0246* (2013.01); *G06Q 30/0277* (2013.01); *H04H 60/31* (2013.01)

(58) Field of Classification Search
  CPC .............. G06Q 30/02; G06Q 30/0246; G06Q 30/0277; G06Q 30/0201; H04H 60/31
  See application file for complete search history.

(56) References Cited

U.S. PATENT DOCUMENTS

| | | | |
|---|---|---|---|
| 5,724,521 A | 3/1998 | Dedrick | |
| 5,948,061 A | 9/1999 | Merriman et al. | |
| 5,991,734 A | 11/1999 | Moulson | |
| 6,167,382 A | 12/2000 | Sparks et al. | |
| 6,401,075 B1 | 6/2002 | Mason et al. | |
| 6,628,928 B1 | 9/2003 | Crosby et al. | |
| 6,985,882 B1 | 1/2006 | Del Sesto | |
| 8,386,311 B2 | 2/2013 | Park et al. | |
| 2002/0124074 A1 | 9/2002 | Levy et al. | |

(Continued)

FOREIGN PATENT DOCUMENTS

| | | |
|---|---|---|
| JP | 2006-261782 | 9/2006 |
| WO | WO 97/21183 | 6/1997 |

OTHER PUBLICATIONS

Advertising on the Internet Second Edition by Robbin Zeff and Brad Aronson The Art and Science of Web Measurement Aug. 1999.*

(Continued)

*Primary Examiner* — William Rankins
(74) *Attorney, Agent, or Firm* — Fish & Richardson P.C.

(57) ABSTRACT

A computer-implemented method for monitoring the effectiveness of advertisements broadcast is described. The method includes detecting that an advertisement has been aired by a broadcast station, monitoring a network for a duration subsequent to the airing of the advertisement for activity attributable to the airing of the advertisement, and developing a quantitative relationship between the activity and a number of listeners of the advertisement.

30 Claims, 5 Drawing Sheets

(56) References Cited

U.S. PATENT DOCUMENTS

| | | | |
|---|---|---|---|
| 2003/0220866 A1 | 11/2003 | Pisaris-Henderson et al. | |
| 2004/0024633 A1 | 2/2004 | Whymark | |
| 2006/0085521 A1 | 4/2006 | Sztybel | |
| 2007/0016918 A1* | 1/2007 | Alcorn et al. | 725/22 |
| 2007/0038516 A1* | 2/2007 | Apple et al. | 705/14 |
| 2007/0112627 A1 | 5/2007 | Jacobs et al. | |
| 2007/0162862 A1 | 7/2007 | Ogasawara et al. | |
| 2008/0133342 A1* | 6/2008 | Criou et al. | 705/14 |
| 2008/0235088 A1* | 9/2008 | Weyer et al. | 705/14 |
| 2008/0255904 A1 | 10/2008 | Park | |
| 2009/0210892 A1 | 8/2009 | Ramaswamy | |
| 2011/0040616 A1 | 2/2011 | Kannan et al. | |
| 2011/0231243 A1 | 9/2011 | Bhatia et al. | |
| 2012/0046996 A1 | 2/2012 | Shah et al. | |
| 2012/0054021 A1 | 3/2012 | Kitts et al. | |

OTHER PUBLICATIONS

TV Ratings Jun. 2005.*
Aaddzz Brokers Web Ad Space Sales Between Advertisers & Publishers, "The Best Way to Buy and Sell Web Advertising Space," 1997. (6 pages) [online] Retrieved from the Internet: <URL:http://www.aaddzz.com>.
Accipiter, Inc., "Accipiter announces Accipiter AdManager, a breakthrough in Internet advertising and marketing" (2 pages) [Online], [retrieved on Apr. 1, 2008]. Retrieved from the Internet <URL:http://web.archive.org/web/19980201092220/www.accipiter.com/press/releases/pr_adman10.htm> Sep. 9, 1996.
Adforce, User Guide Version 2.6, "A Complete Guide to AdForce," 1998 (285 pages).
AdKnowledge Corporate Information, Company Overview, (2 pages) [online retrieved Aug. 16, 2007] Retrieved from <URL:http://web.archive.org/web/19990128143110/www.adknowledge.com/corporate/index.html>.
Adknowledge Customers, i-traffic, [Online], [retrieved Aug. 16, 2007] (2 pages) Retrieved from the Internet: <URLhttp://web.archive.org/web/19990503093107/www.adknowledge.com/aksystem/profile_itraffic.html>.
AdKnowledge Inc., "Automates the targeting and serving of web advertising campaigns," (3 pages), [Online], [retrieved on Aug. 16, 2007] Retrieved from the Internet: <URL:http://web.archive.org/web/19990222023416/www.adknowledge.com/aksystem/smartbanner.html>.
AdKnowledge Inc., "Comprehensive Planning," (3 pages), [Online], [retrieved on Aug. 16, 2007] Retrieved from the Internet: <URL:http://web.archive.org/web/19990221144457/www.adknowledge.com/aksystem/planner.html >.
AdKnowledge Inc., "The AdKnowledge System," (2 pages), [Online], [retrieved on Aug. 16, 2007] Retrieved from the Internet: <URL:http://web.archive.org/web/19990221115917/www.adknowledge.com/aksystem/index.html>.
AdKnowledge Inc., Corporate Information "AdKnowledge Events," (1 page), [Online], [retrieved on Aug. 16, 2007] Retrieved from the Internet: <URL:http://web.archive.org/web/20000511005235/www.adknowledge.com/whatsnew/events.html >.
Adknowledge Primary Services, Customer Reference Guide. pp. 1-90, 2000.
AdKnowledge, Inc., Campaign Manager, "Streamlines buying and trafficking while saving time and money," (3 pages), [Online], [retrieved Aug. 16, 2007] Retrieved from the internet: <URL:http://web.archive.org/web/19990221080152/www.adknowledge.com/aksystem/c ampaign.html>.
Adwiz by NEC, "The Artificial Intelligence Solution for Advertisement Targeting," (1 page), [Online], [retrieved Apr. 1, 2008] Retrieved from the Internet: <URL:http://web.archive.org/web/20000816042946/http://www.ccrl.com/adwiz/>.
Blinkx, "Video Search Engine—Blinkx," (1 page), [Online], [retrieved Apr. 16, 2008]. Retrieved from the Internet: <URL:http://blinkx.com/>.

ENCO: World Class Digital Audio Delivery Systems, [online], Retrieved from the Internet: <URL: http://www.enco.com/index.htm>.
Engage Technologies, Accipiter, "AdManager Frequently Asked Questions." (3 pages), [Online], [retrieved Apr. 1, 2008]. Retrieved from the Internet <URL:http://web.archive.org/web/19990208222457/www.accipiter.com/products/admanager/adm_faq.htm> Feb. 8, 1999.
Engage Technologies, Accipiter, "Questions and Answers about using Accipiter AdManager with Engage Precision Profiles" (3 pages), [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.
EveryZing, Inc., "Video SEO and Multimedia Search Solutions," (3 pages), [Online], [retrieved Apr. 16, 2008], Retrieved from the Internet: <URL:http://everyzing.com/>.
IEEE Intelligent Systems, New Products, "Tell your computer where to go," (4 pages), United Kingdom, Jan./Feb. 1998.
Information Access Technologies, Inc., "Aaddzz Ad Sizes," (2 pages), [Online], [retrieved Apr. 15, 2008] Retrieved from the Internet: <URL:http://web.archive.org/web/19980130092848/www.aaddzz.com/pages/sizes>.
Information Access Technologies, Inc., Aaddzz Ads, Spaces, & Places (2 pages), [Online], [retrieved Apr. 14, 2008] Retrieved from the Internet: <URL:http://web.archive.org/web/19980130092810/www.aaddzz.com/pages/b-adspacesplaces>.
Information Access Technologies, Inc., "Aaddzz Advanced Topics," (4 pages), [Online], [retrieved Apr. 15, 2008] Retrieved from the Internet: <URL:http://web.archive.org/web/19980130092908/www.aaddzz.com/pages/advanced>.
Information Access Technologies, Inc., "Aaddzz Advertisers," (4 pages), [Online], [retrieved Apr. 15, 2008] Retrieved from the Internet: <URL:http://web.archive.org/web/19980130092804/www.aaddzz.com/pages/b-advertise>.
Information Access Technologies, Inc., "Aaddzz Buying Ad Space with Aaddzz," (5 pages), [Online], [retrieved Apr. 15, 2008] Retrieved from the Internet: <URL:http://web.archive.org/web/19980130092822/www.aaddzz.com/pages/advertising>.
Information Access Technologies, Inc., "Aaddzz Fees and Payments," (3 pages), [Online], [retrieved Apr. 15, 2008] Retrieved from the Internet: <URL:http://web.archive.org/web/19980130092836/www.aaddzz.com/pages/pricing>.
Information Access Technologies, Inc., "Aaddzz Free Access Reports," (2 pages), [Online], [retrieved Apr. 15, 2008] Retrieved from the Internet: <URL:http://web.archive.org/web/19980130092902/www.aaddzz.com/pages/reports>.
Information Access Technologies, Inc., "Aaddzz Frequently Asked Questions," (4 pages), [Online], [retrieved Apr. 15, 2008] Retrieved from the Internet: <URL:http://web.archive.org/web/19980130092914/www.aaddzz.com/pages/faq>.
Information Access Technologies, Inc., "Aaddzz Home Page," (2 pages), [Online], [retrieved Apr. 15, 2008] Retrieved from the Internet: <URL:http://www.aaddzz.com/letter.html>.
Information Access Technologies, Inc., "Aaddzz Publishers," (2 pages), [Online], [retrieved Apr. 15, 2008] Retrieved from the Internet: <URL:http://web.archive.org/web/19980130092758/www.aaddzz.com/pages/b-publish>.
Information Access Technologies, Inc., "Aaddzz Ratings," (3 pages), [Online], [retrieved Apr. 15, 2008] Retrieved from the Internet: <URL:http://web.archive.org/web/19980130092842/www.aaddzz.com/pages/ratings>.
Information Access Technologies, Inc., "Aaddzz Real-Time Reporting & Statements," (2 pages), [Online], [retrieved Apr. 15, 2008] Retrieved from the Internet: <URL:http://web.archive.org/web/19980130092816/www.aaddzz.com/pages/b-realtime>.
Information Access Technologies, Inc., "Aaddzz Selling Ad Space With Aaddzz," (5 pages), [Online], [retrieved Apr. 15, 2008] Retrieved from the Internet: <URL:http://web.archive.org/web/19980130092829/www.aaddzz.com/pages/selling>.

(56) References Cited

OTHER PUBLICATIONS

Information Access Technologies, Inc., "Introduction to Aaddzz," (2 pages), [Online], [retrieved Apr. 15, 2008] Retrieved from the Internet: <URL:http://web.archive.org/web/19980130092752/www.aaddzz.com/pages/b-intro>.

Information Access Technologies, Inc., Aaddzz Highlights: The Maximum Performance Ad Network, "Aaddzz brokers Web ad space between advertisers & publishers," 1997 (2 pages), [Online], [retrieved Apr. 15, 2008] Retrieved from the Internet: <URL:http://web.archive.org/web/19980130092746/www.aaddzz.com/pages/b-highlights>.

Inside Online Video, "Blinkx to Contextualize Video Ads Through Speech Recognition," Jun. 22, 2007 (2 pages), [Online], [retrieved Apr. 16, 2008] Retrieved from the Internet: <URL:http://www.insideonlinevideo.com/20007/06/22/blinkx-to-contextualize-video-ads-through-speech-recognition/>.

Langheinrich et al., "Unitrusive Customization Techniques for Web Advertising," NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-www8.html>.

NEC Corporation, "ADWIZ Intelligent Advertisement Targeting," 1998-1999, 1 page.

NEC Corporation, NEC: Press Release "NEC announces ADWIZ, an Artificial Intelligence Solution for Advertisement Targeting Software on the World Wide Web," Jan. 8, 1999.

NEC Corporation, ADWIZ White Paper, "Taking Online Ad Targeting to the Next Level," [Online], [retrieved on Apr. 15, 2008] Retrieved from the Internet: <URL:http://web.archive.org./web/20010619222015/www.ccrl.com/adwiz/whitepaper.html/>.

ScanScout, "ScanScout in the News," [Online], [retrieved Apr. 16, 2008]. Retrieved from the Internet: <URL:http://scanscout.com/>.

Zeff and Aronson, "Advertising on the Internet," second edition, The Art and Science of Web Measurement, pp. 1-436 (1999).

Final Office Action in U.S. Appl. No. 12/621,966, mailed Apr. 13, 2012, 21 pages.

Korean Intellectual Property Office, Notification of Transmittal of the International Search Report and the Written Opinion of the International Searching Authority for PCT/US2008/060257. Sep. 24, 2008 (12 pages).

International Search Report and Written Opinion in International Application No. PCT/US2010/057219, mailed Jul. 7, 2011, 11 pages.

International Preliminary Report on Patentability in International Application No. PCT/US2010/057219, mailed May 31, 2012, 6 pages.

International Preliminary Report on Patentability in International Application No. PCT/US2008/060257, mailed Sep. 24, 2008, 7 pages.

* cited by examiner

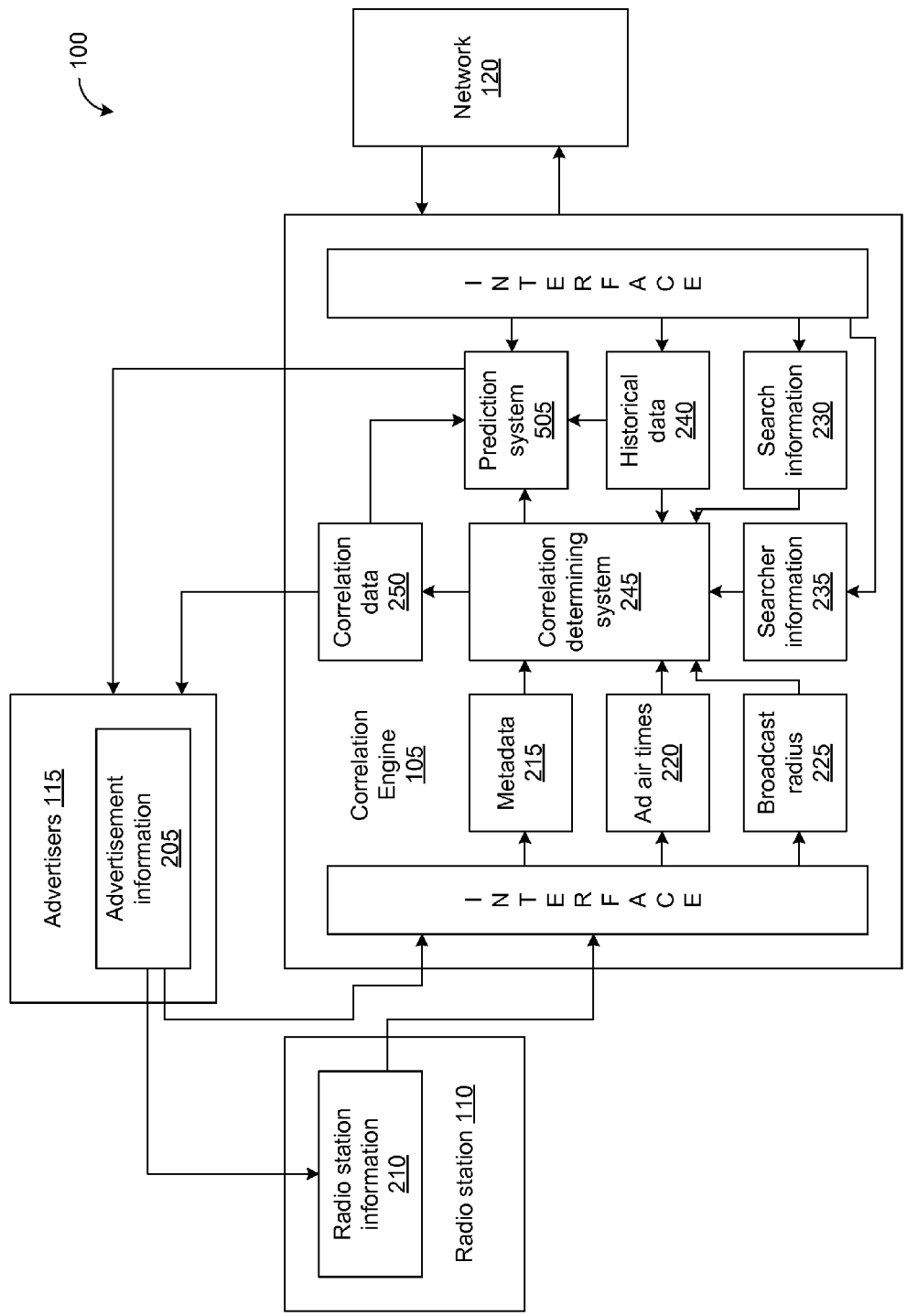

US 9,082,133 B2

ESTIMATING OFF-LINE ADVERTISING IMPRESSIONS

CROSS-REFERENCE TO RELATED APPLICATIONS

This application is a continuation application of, and claims priority to, U.S. patent application Ser. No. 12/102,790, entitled "ESTIMATING OFF-LINE ADVERTISING IMPRESSIONS", filed on Apr. 14, 2008, which claims priority to U.S. Provisional Application No. 60/911,781 filed Apr. 13, 2007. The disclosure of the foregoing applications is incorporated herein by reference in its entirety.

TECHNICAL FIELD

The following description relates to monitoring the effectiveness of advertisements presented via "off-line" media such as broadcast radio or television.

BACKGROUND

Radio is a popular medium for information and entertainment. Radio stations can reach a national audience. Local radio stations can present content to listeners in a geographical region that lies within the broadcast radius of the radio station. Satellite radio and internet radio can be available to local, national, and global audiences. Advertisers can present advertisements related to their products and services on radio stations to target listeners. In turn, radio stations can generate revenue by airing advertisements provided by advertisers.

One or more radio stations can be available to listeners in a geographical region. All content provided by a radio station can be based on a common theme, e.g., musical genre. In addition to playing music of the same genre, the radio station can also provide information related to music shows, concerts, and the like, that share the radio station's theme. Advertisements presented at such theme-based radio stations can also be specific to the theme of the station. Alternatively, the content presented by a radio station can span over a range of themes, wherein each piece of content can be aired at a different time. Advertisements aired at different times can be related to the theme of the content being aired at that time. In addition, advertisements unrelated to the theme of the radio station or the type of content being aired can be presented on radio stations at any time. Such blanket advertisements can be geared towards listeners within the geographical region to which the radio broadcast extends. For example, an auto dealership at a location within the broadcast radius of one or more radio stations can present advertisements related to the auto dealership on each of the radio stations to be aired at any time. Such advertisements need not be restricted to the theme of the radio station or the type of content being aired. The target consumer can be any listener within the broadcast radius of the one or more radio stations, where the broadcast radius of all the radio stations is the geographical region to which the auto dealership is trying to advertise.

An advertisement aired on a radio station can include the advertiser's contact information, e.g., street address, telephone number, internet address pointing to a web page on a web site hosted by the advertiser, and the like. The number of listeners who seek information about the advertiser upon listening to the advertisement can represent a number of impressions that can serve as a measure of the return on the investment made to advertise at a given radio station. The number of impressions can depend on one or more factors including the target audience for the product being advertised, the time at which the advertisement is presented, the proximity of the advertiser to a listener within the broadcast radius of the radio station, and the like.

Being able to estimate, or otherwise determine, the number of impressions generated by a particular advertisement or advertising campaign is a valuable measure of the impact and effectiveness of advertising dollars spent.

SUMMARY

In one example, the system and techniques described here can be used to develop a correlation between information related to an advertisement aired on a radio station and internet activity related to the content of the advertisement subsequent to the airing of the advertisement. The correlation can be based on several factors including, e.g., the content of the advertisement, the time when the advertisement is aired, the broadcast radius of the radio station on which the advertisement is aired, the listening audience, and the like. The correlation can be a measure of the return on the investment for advertising on a given radio station at a given time.

In one aspect, a computer implemented method is described. The method includes detecting that an advertisement has been aired by a broadcast station, monitoring a network for a duration subsequent to the airing of the advertisement for network activity attributable to the airing of the advertisement, and developing a quantitative relationship between the network activity and a number of listeners of the advertisement.

This, and other aspects, can include one or more of the following features. The broadcast station can include a radio or television station. The method can further include receiving information related to the advertisement, and information related to the radio station where the advertisement is aired. The information related to the advertisement can include at least one of the advertisement content and advertisement metadata. The advertisement metadata can include at least a type of the advertisement content, a target audience, and preferred air times. The information related to the radio station can include at least a theme of content aired at the radio station, time slots for presenting advertisements, schedule of content aired at the radio station, and a broadcast radius. Monitoring the network for activity can include monitoring content of a search query entered at a network location configured to enable searching the network for content, wherein the search query content is monitored for a match with the content of the aired advertisement, and monitoring access to a network location, the accessed network location including content relevant to the advertisement. An identifier pointing to the accessed network location can be included in the advertisement content. Developing a quantitative relationship can include determining a number of network searches related to the content of the advertisement on the network within the duration, and a number of accesses of a network location related to the advertisement within the duration, comparing the determined number of network searches and number of accesses to the network location with a previous number of network searches related to the content and a previous number of accesses to the network location related to the content, determining an increase in the number of network searches and the number of accesses to the network location over the previous number of network searches and the previous number of accesses during the duration, wherein the increase is attributable to the airing of the advertisement, and converting the increase in network activity to a number of impressions on the network, wherein the number of impressions on the network is attributable to the airing of the advertisement on the radio station. The number of impressions on the network can be provided to the advertiser. The number of impressions on the network can be provided to the radio station. The network can be the internet.

In another aspect, a system is described. The system includes a correlation engine configured to detect that an advertisement has been aired by a broadcast station, monitor a network for a duration subsequent to the airing of the advertisement for network activity attributable to the airing of the advertisement, and develop a quantitative relationship between the network activity and a number of listeners of the advertisement.

This, and other aspects, can include one or more of the following features. The broadcast station can include a radio or television station. The correlation engine can further be configured to receive information related to the advertisement and information related to the radio station where the advertisement is aired. The information related to the advertisement can include at least one of advertisement content and advertisement metadata. The advertisement metadata can include at least a type of the advertisement content, a target audience, and preferred air times. The information related to the radio station can include at least a theme of content aired at the radio station, time slots for presenting advertisements, a schedule of content aired at the radio station, and a broadcast radius. The correlation engine can further be configured to monitor content of a search query entered at a network location configured to enable searching the network for content, wherein the search query content is monitored for a match with the content of the aired advertisement, and monitor access to a network location, the accessed network location including content relevant to the advertisement. An identifier pointing to be accessed network location can be included in the advertisement content. The correlation engine can further be configured to determine a number of network searches related to the content of the advertisement on the network within the duration, and a number of accesses of a network location related to the advertisement within the duration, compare the determined number of network searches and number of accesses to the network location with a previous number of network searches related to the content and a previous number of accesses to the network location related to the content, and convert the increase in network activity to a number of impressions on the network, wherein the number of impressions on the network is attributable to the airing of the advertisement on the radio stations. The correlation engine can further be configured to provide the number of impressions on the network to the advertiser. The correlation engine can further be configured to provide the number of impressions on the network to the radio station. The network can beat the internet.

In another aspect, a system is described. The system includes means for detecting that an advertisement has been aired by a broadcast station, means for monitoring a network for a duration subsequent to the airing of the advertisement for network activity attributable to the airing of the advertisement, and means for developing a quantitative relationship between the network activity and a number of listeners of the advertisement.

This, and other aspects, can include one or more of the following features. The broadcast station can include a radio or television station. The system can further include means for receiving information related to the advertisement and information related to the radio station where the advertisement is aired. The information related to the advertisement can include at least one of advertisement content and advertisement metadata. The advertisement metadata can include at least a type of the advertisement content, a target audience, and preferred air times. The information related to the radio station can include at least a theme of content aired at the radio station, time slots for presenting advertisements, schedule of content aired at the radio station, and a broadcast radius. The system can further include means for monitoring content of a search query entered at a network location configured to enable searching the network for content, wherein the search query content is monitored for a match with the content of the aired advertisement, and means for monitoring access to a network location, the accessed network location including content relevant to the advertisement. An identifier pointing to the accessed location can be included in the advertisement content. The system can further include means for determining a number of network searches related to the content of the advertisement on the network within the duration, and a number of accesses of a network location related to the advertisement within the duration, means for comparing the determined number of network searches and number of accesses to the network location with a previous number of network searches related to the content and a previous number of accesses to the network location related to the content, means for determining an increase in the number of network searches and the number of accesses to the network location over the previous number of network searches and the previous number of accesses during the duration, wherein the increase is attributable to the airing of the advertisement, and means for converting the increase in network activity to a number of impressions on the network, wherein the number of impressions on the network is attributable to the airing of the advertisement on the radio station. The system can further include means for providing the number of impressions on the network to the advertiser. The system can further include means for providing the number of impressions on the network to the radio station. The network can be the internet.

The system and techniques described here can present one or more of the following advantages. A quantitative description of the number of consumers reached by an advertisement aired at a radio station at a specific time can enable advertisers to better target consumers. Advertisers can determine a suitable time to air an advertisement on a radio station so that a maximum number of listeners can be reached. Additionally, this information can enable advertisers to streamline investment in marketing to maximize the return on investment. In addition, advertisers can be encouraged to improve the content of advertisements to attract more listeners during a particular time slot. Further, advertisers can not only choose air times that result in maximum exposure of their products but can also avoid airing their advertisements at other times to prevent overexposure of their products to listeners. Also, advertisers can identify markets and time slots where more advertising is required. Furthermore, based on the quantitative description, radio stations can determine the value of a time slot for presenting an advertisement. Since advertisements are a source of funding, radio stations can specify prices for different time slots based on the quantitative description obtained.

The details of one or more implementations are set forth in the accompanying drawings and the description below. Other features and advantages will be apparent from the description and drawings, and from the claims.

DESCRIPTION OF DRAWINGS

FIG. 5 is a schematic of an example of a system for determining the effectiveness of an advertisement aired on a radio station.

Like reference symbols in the various drawings indicate like elements.

DETAILED DESCRIPTION

Figure 1:
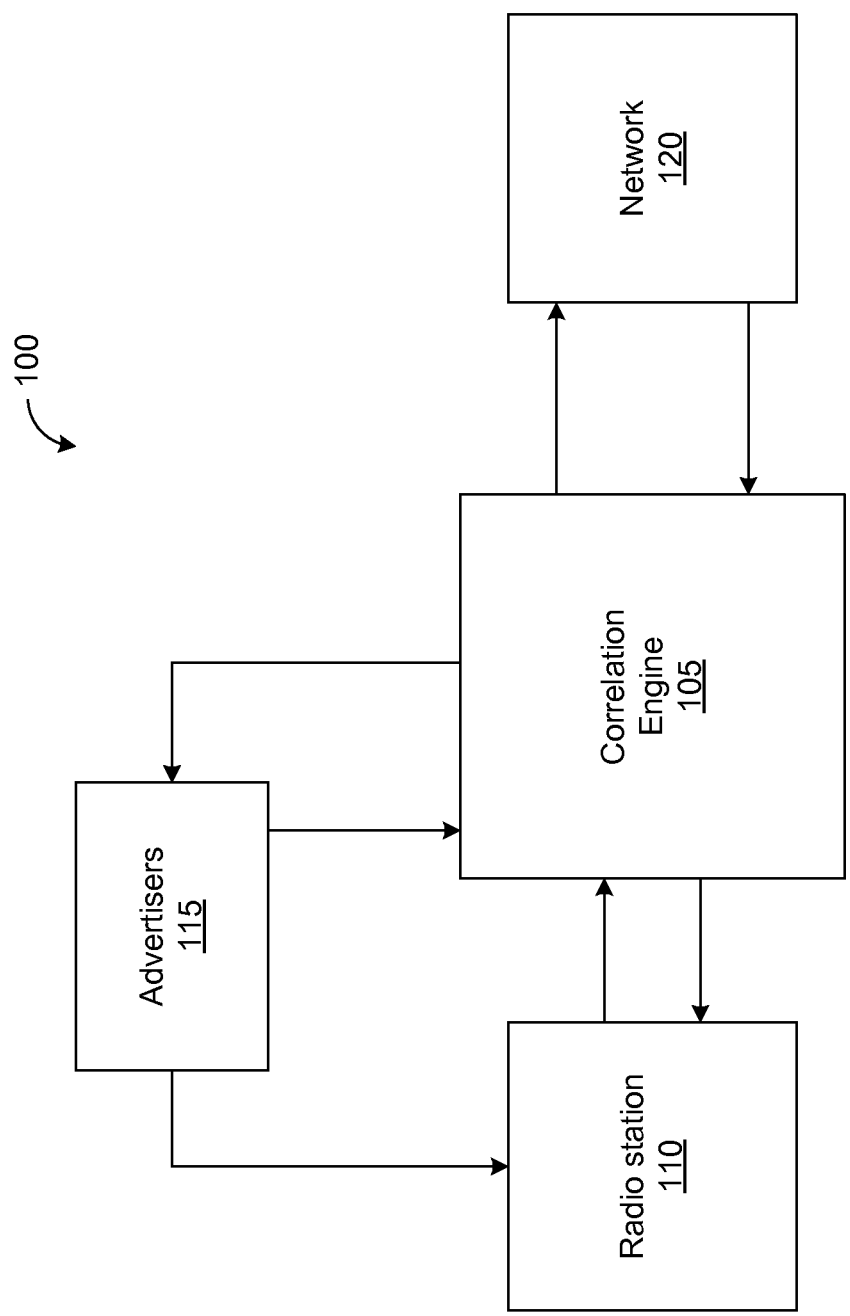
FIG. 1 is a schematic of an example of a system for determining the effectiveness of an advertisement aired on a radio station.

FIG. 1 is a schematic of an example depicting a system 100 for determining the effectiveness of an advertisement aired on a radio station. The station can be any broadcast station including a radio station and a television station. In some implementations, the system 100 can include a correlation engine 105 that can be operatively coupled to interact with one or more radio stations 110, one or more advertisers 115, and a network 120. The network can be the internet. In some implementations, the correlation engine 105 can be configured to receive information related to a radio station 110. The information can include the content to be played by the radio station 110, the programming schedule, where the schedule can include past, present, and future schedules, special programming, and the like. Additional information can include the theme of content played at the radio station, availability of the radio station to listeners via satellite or on the internet, or both, and the like.

In some implementations, the correlation engine 105 can be additionally coupled to receive input from and send output to advertisers 115. In addition, the advertisers 115 can present advertisements to the radio station 110 to be aired at times specified by the advertisers 115. In other implementations, the advertisers 115 can push the advertisements to the correlation engine 105 which can, in turn, transmit the advertisements to the radio station 110 for presentation at one or more pre-determined times. In other implementations, the advertisers 115 can transmit the content of an advertisement to the radio station 110. The air-times for the advertisement can be transmitted to the radio station 110 by the correlation engine 105.

In some implementations, the advertisers 115 can request one or more radio stations 110 to air advertisements related to the advertisers' products and services. In other implementations, the one or more radio stations 110 can request advertisers 115, who provide products and services related to the theme of the radio station 110, for advertisements. For example, a radio station that plays jazz music can request organizers at a venue hosting an upcoming jazz music event to present advertisements related to the event at the radio station. In this manner, the radio station 110 can benefit by airing products and services of advertisers 115, while the advertisers 115 can benefit by the exposure of their products and services to the listeners of the radio station 110. In some implementations, the type of products and services offered by an advertiser 115 can be stored in the correlation engine 105. The theme of the one or more radio stations 110 can also be stored in the correlation engine 105. The correlation engine 105 can be configured to match the advertisers 115 with radio stations 110 based on the stored information.

The correlation engine 105 can interact with a network 120, e.g., the internet. The correlation engine 105 can monitor traffic to one or more web pages on web sites on the internet. In addition, the correlation engine 105 can monitor search queries presented at one or more web sites that serve as interfaces to interact with search engines. In some implementations, the correlation engine 105 can include a server hosting one or more web sites, a search engine, and the like. In other implementations, the correlation engine 105 can be operatively coupled to the servers of one or web pages, either through wired means or over the network 120 or over one or more networks 120, to receive information from the servers when activity is detected at the server end.

In some implementations, an advertiser 115 can present advertisements to be aired to a radio station 110. In addition, the advertiser 115 can present metadata related to the advertisement to the radio station 110. The metadata can include information related to the type of advertisement, the target audience, preferred air times, and the like. The radio station 110 can air the advertisement based on the preferences specified by the advertiser 115. The metadata related to an advertisement can be input to the correlation engine 105. In some implementations, the correlation engine 105 can receive the metadata from the advertiser 115. In other implementations, the correlation engine 105 can receive the metadata from the radio station 110. In some implementations, metadata related to specific advertisements can be pushed to the correlation engine 105. In other implementations, the correlation engine 105 can pull metadata related to one or more advertisements from the radio station 110, the advertiser 115, or both.

When an advertisement is aired by a radio station, the correlation engine 105 can monitor the network 120 for activity related to the content of the advertisement. For example, when an advertisement related to an auto dealership in a geographic region, e.g., Los Angeles, is aired at a certain time, the correlation engine 105 can monitor the internet for search lifts related to the advertisement, which is an increase in searches on websites, e.g., www.google.com, for the auto dealership or an increase in network traffic to a web page of a web site related to the advertised product, or both, attributable to the airing of the advertisement, particularly by users accessing the internet in or around Los Angeles. The correlation engine 105 can develop a quantitative relationship between the search lifts for the products and services advertised in the advertisement measured near the time when the advertisement was aired and a number of listeners who listened to the advertisement on the radio and accessed the internet for information related to the advertised product. Particular attention can be devoted to the number of listeners who accessed the internet within a geographical region that the advertiser wishes to target. The quantitative relationship can be presented to an advertiser 115 as a measure of a number of impressions generated by airing the advertisement at the radio station 110 at the pre-determined time. In this manner, a number of impressions generated on a network by advertising on an off-line medium, e.g., a radio station, can be obtained and an advertiser 115 can be provided with a measure of the return on the investment made to advertising.

Figure 2:
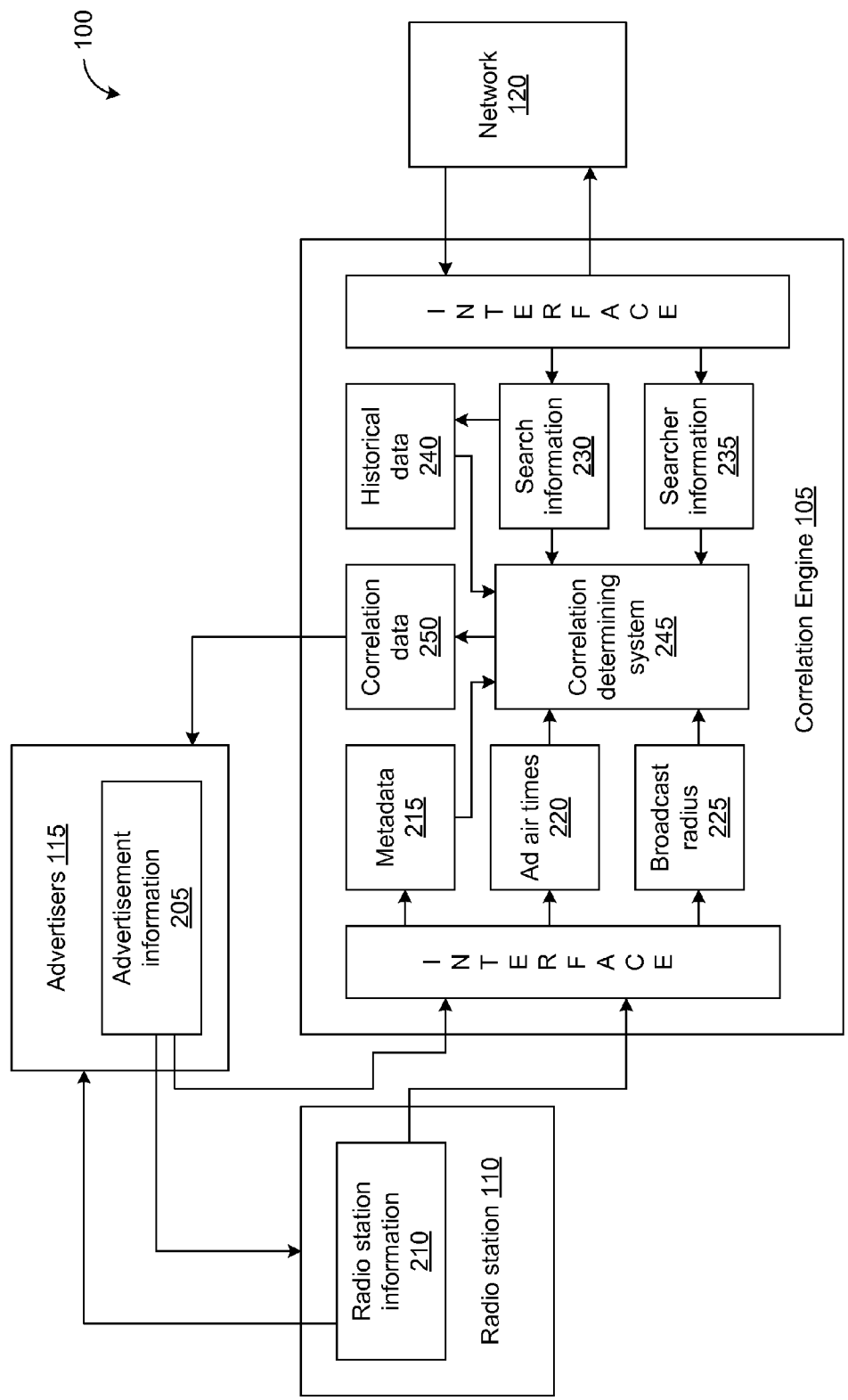
FIG. 2 is a schematic of an example of a system for determining the effectiveness of an advertisement aired on a radio station.

FIG. 2 depicts a schematic of an example for quantitatively determining the effectiveness of an advertisement aired on a radio station 110 at a given time. In some implementations, advertisers 115 can provide advertisement information 205 to the radio station 110. The advertisement information 205 can include advertisement content, metadata 215 related to the advertisement, and the like. The metadata 215 can include the type of content, preferred air times, and the like. Alternatively or in addition, the advertisement information 205 can also be provided to the correlation engine 105. In some implementations, both the advertisement content and the metadata 215 related to the advertisements can be provided to the correlation engine 105. In other implementations, the advertisement content can be provided to the radio station 110 while the metadata 215 can be provided to the correlation engine 105. Based on the received metadata 215, the correlation engine 105 can provide preferred air times for a given advertisement to the radio station 110. In other implementations, the content of an advertisement can be retained by the advertiser 115. The advertiser 115 can provide only the metadata 215 related to the advertisement to the radio station 110, the correlation engine 105, or both. Before a preferred air time for an advertisement, the radio station 110 can pull the corresponding advertisement from the advertiser 115. In other implementations, before the preferred air time for the advertisement, the correlation engine 105 can pull the advertisement from the advertiser 115 and provide the advertisement to the radio station 110. In other implementations, the correlation engine 105 can instruct the advertiser 115 to provide the advertisement to the radio station 110 before the preferred air time, based on the metadata 215 related to the advertisement stored in the correlation engine 105.

In some implementations, the radio station 110 can provide radio station information 210 to the correlation engine 105. Alternatively, or in addition, the radio station 110 can provide radio station information 210 to the advertisers 115. The radio station information 210 can include the type of content aired by the radio station 110, the schedule for airing content, availability of time slots for presenting advertisements, and the like. Advertisers 115 can choose one or more radio stations to air advertisements based on the radio station information 210. Alternatively, an advertiser 115, having chosen a radio station 110 to air advertisements, can further determine specifics for airing the advertisements based on the radio station information 210. For example, a radio station 110 in one geographic location can have affiliates and member stations at different geographic locations. The locations of the affiliates of the radio station 110 can be included in the radio station information 210. Based on the radio station information, an advertiser 115 can choose one or more of the affiliated radio stations, in addition to the radio station 110, for airing advertisements. The advertiser's decision to air advertisements at the affiliated radio stations can be based on factors including the availability of the advertisers' products and services at or near the geographic location covered by the affiliated radio stations.

In some implementations, the correlation engine 105 can receive and store the metadata 215 related to the advertisements, advertisement (ad) air times 220, and the broadcast radius 225 of the radio station 110. The advertisers 115 can provide the metadata 215 and the ad air times 220 to the correlation engine 105. The radio station 110 can provide the broadcast radius 225 to the correlation engine 105 as part of the radio station information 210. In other implementations, the metadata 215, the ad air times 220, and the broadcast radius 225 can be collected by either the advertisers 115 or the radio station 110 and provided to the correlation engine 105.

The correlation engine 105 can include search information 230, searcher information 235, and historical data 240. The search information 230 can include the content of search queries entered at a network location on the network 120. The network location can be a web page of a web site, e.g., www.google.com. A user at the network location can interact with the Google search engine via the web page to search for content. For example, the user can enter a search query in a text box on the web page. The Google search engine can send the entered search query to the correlation engine 105. Alternatively, the correlation engine 105 can be operatively coupled to the Google search engine to receive a search query whenever a search query is entered in the text box at the network location. In addition, the search information 230 can include a specific time when the search was conducted. For example, the time when a search query was entered into a text box at the network location can be included in the search information 230.

The searcher information 235 can include a geographical location of a user entering the search query. For example, the geographical location of the user can be determined by an internet protocol (IP) address of the instrument with which the user interacts with the network 120. The searcher information 235 can also be gathered based on the search query entered by the user. For example, a user may enter "coffee shops Los Angeles" as a search query subsequent to listening to an advertisement for a coffee shop in Los Angeles. Based on this search query, the geographical location of interest to the user can be determined to be Los Angeles. In addition, the geographic region in which the user is interested and the location wherefrom the user accesses the internet can also be determined. Additionally, the searcher information 235 can include information about the searcher based on previously conducted searches, the search query entered, and the like.

In some implementations, the correlation engine 105 can be configured to monitor one or more network locations on the network 120 to determine search information 230 and searcher information 235. In other implementations, search information 230, searcher information 235, and the like can be collected by external engines. The correlation engine 105 can be operatively coupled to the external engines to receive information including search information 230 and searcher information 235. The correlation engine 105 can be configured to monitor the external engines for updates to the search information 230 and searcher information 235 and receive updated information when a change is detected.

Historical data 240 can be a collection of searches and search results related to one or more topics accumulated over a period of time. Several users can access the network location to search for content using the search engine, e.g., the Google search engine. When a user enters a search query, content at several network locations is searched, network locations containing content relevant to the search query are identified, and the network locations containing relevant content are presented to the user. Additionally, the network locations containing relevant content can be ranked with the highest ranked locations containing the most relevant content.

The historical data 240 can also include past information including topics of searches, frequencies of searches for topics, deviations from the search frequencies, causes for deviation, and the like. For example, the frequency of searches related to the National Football League (NFL) may be higher during the regular season and the play-offs than during the off-season. Information collected over previous years may indicate a trend where more search queries related to the NFL are entered during the regular season than during the off-season. The historical data 240 can include the frequency of searches related to the NFL during the off-season, the frequency of searches related to the NFL during the regular season and the play-offs, and an average annual frequency of searches related to the NFL. Similarly, the historical data 240 can include frequency of searches related to any topic searched on the network by entering a search query at the network location provided by the search engine. In addition, the frequency of searches can be gathered and maintained with temporal granularity, e.g., every second, every minute, hourly, daily, weekly, monthly, and the like. The historical data 240 can include each monitored frequency.

The frequency of searches for a topic during a given period may be expected to match the average frequency from previous years within a standard deviation. Events may occur causing a surge in the number of searches related to a topic resulting in the related frequency being significantly greater than the average frequency from previously collected data. For example, an announcement regarding a major trade between teams during the off-season may increase the number of searches related to the NFL, causing the frequency of searches related to the NFL to be greater than the average frequency for that period based on historical data. The increase in frequency over the average frequency can represent a search lift. A search lift can represent an increase in a frequency of search related to a topic at a given time over the average frequency for that topic at that time, where the average frequency can be determined from data collected over previous years. In addition, a search lift can also include an increase in network traffic to a network location that is known to contain information related to the topic causing the surge in network traffic. For example, while a search lift can include an increase in a frequency of searches at network search engines due to the major trade between teams during the off-season, the search lift can also include an increase in traffic to websites containing NFL news, e.g., www.nfl.com, www.espn.com, and the like. Permission to track traffic to the websites may be previously obtained from the websites. Similar search lifts can also result when access to an advertiser's 115 web site increases subsequent to the advertiser's 115 advertisement airing on a radio station 110.

In some implementations, the historical data 240 can be collected by external engines including or operatively coupled to search engines. The correlation engine 105 can be operatively coupled to such external engines to receive the historical data 240. Alternatively, or in addition, the historical data 240 can be collected and monitored by the correlation engine. In some implementations, the correlation engine 105 can receive, collect, and monitor historical data 240 related only to search queries and network locations related to advertisers 115 and radio stations 110 operatively coupled to the correlation engine 105. In other implementations, the correlation engine 105 can collect and monitor historical data 240 of the entire network and use the historical data 240 to detect search lifts related to advertisers 115 and radio stations 110 operatively coupled to the correlation engine 105.

The correlation engine 105 can include a correlation determining system (CDS) 245. The CDS 245 can receive input gathered from the radio station 110, the advertisers 115, and the network 120. In some implementations, the input to the CDS 245 can include the metadata 215 related to advertisements, ad air times 220 received from either the radio station 110 or the advertisers 115 or both, the broadcast radius 225 of the radio station 110, search information 230 and searcher information 235 based on information collected from the network 120, e.g., the internet, and the like. In addition, the CDS 245 can be operatively coupled to the historical data 240. The CDS 245 can receive a time for airing an advertisement from ad air times 220. Subsequent to the advertisement being aired on the radio station 110, the correlation engine 105 can monitor the network 120 for searches related to the advertisement and traffic to network locations related to the advertisement, particularly from network locations within the broadcast radius 225 of the radio station 110 presenting the advertisement. The correlation engine 105 can collect search information 230 and searcher information 235 and provide the collected information to the CDS 245. The CDS 245 can compare the search information 230 and enhanced network traffic to network locations with the historical data 240 for the same products and services. The CDS 245 can identify any search lift related to the advertised products and services, particularly during and substantially close to a time after the advertisement was aired. The CDS 245 can develop a quantitative relationship between the search lift and a number of impressions generated on the network. The number of impressions generated can include a number of hits on a web page of a web site containing information about the advertisement, a number of searches on the internet, where the search query is related to the advertisement, or both. Further, the number of impressions generated can be attributable to the airing of the advertisement. In this manner, the quantitative relationship can be represented as a number of impressions generated on one or more network locations as a result of airing the advertisement on the radio station.

The CDS 245 can transfer the quantitative relationship to the correlation data 250. In some implementations, the CDS 245 can determine quantitative relationships at pre-determined time intervals starting from the instant the advertisement is aired on the radio station 110 and ending at a duration after the time the advertisement was aired. In some implementations, the duration between the air time of the advertisement and when quantitative relationship information is no longer computed, can be pre-determined by the correlation engine 105. In other implementations, the duration can be specified by the advertiser 115. In other implementations, the duration can be specified by the radio station 110. In other implementations, the duration can extend until such time that the search lift decreases and network traffic related to the advertised product matches previous values of traffic gathered and stored in the historical data 240. The correlation data 250 can be averaged over the entire duration or determined for equal intervals of time, where the sum of the intervals equals the duration, or both. The correlation data 250 can subsequently be provided to the advertiser 115. The availability of a quantitative relationship in the form of a number of generated impressions can enable an advertiser 115 to determine a number of listeners that the advertisement reached. In addition, the correlation data 250 can be presented to the radio station 110. The quantitative relationship can enable a radio station 110 to determine the value of airing an advertisement at a given time, and further enable the radio station 110 to specify a price to the advertiser 115 for airing the advertisement at that time.

Figure 3:
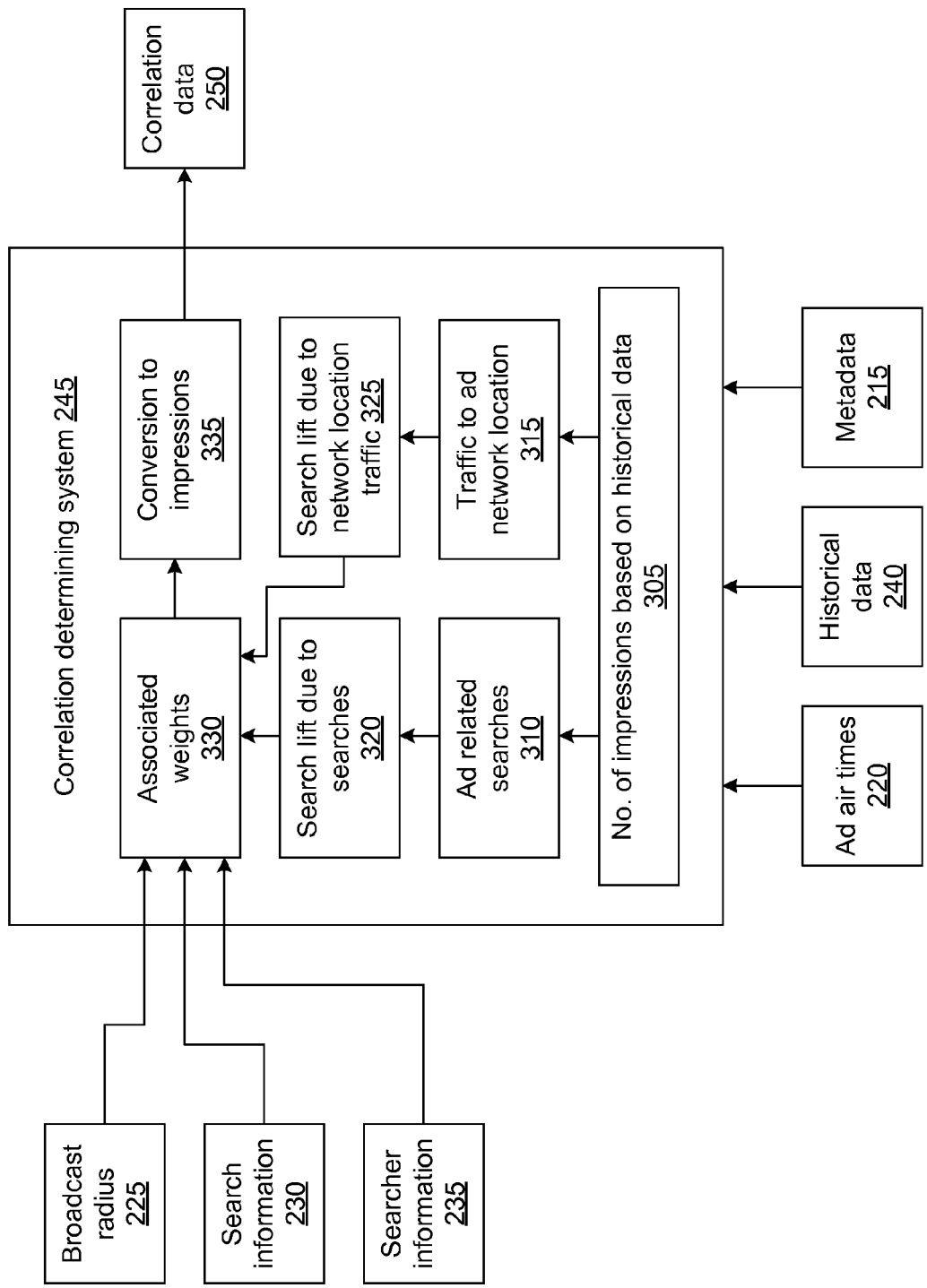
FIG. 3 is a schematic of an example of a correlation determining system.

FIG. 3 depicts a schematic of an example of a correlation determining system 245 to develop a quantitative relationship between search lifts due to an advertisement aired on a radio station 110 and a number of listeners that the advertisement reached. The CDS 245 can include a number of impressions based on historical data 305. For example, the number of impressions based on historical data 305 can include an average number of impressions collected over previous years for several topics of searches. The CDS 245 can include ad related searches 310. The impressions can be related to a specific search topic, e.g., automobiles. If an advertisement by an auto dealership is aired on a radio station at a predetermined time of day on a pre-determined day of the week, listeners of the radio station, having listened to the advertisement can access the internet and can search for the advertised auto dealership. In some implementations, the search query can include information related to the auto dealership. In other implementations, the search query can include information related to the type or brand of automobile sold, or both, and a geographic location of the auto dealership. These and other searches related to the auto dealership can be stored in ad related searches 310. Alternatively, or in addition, listeners can access the web page of the auto dealership. The advertisement can include a uniform resource locator (URL) that points to a web page on a web site maintained by the auto dealership. Network traffic to the web page of the advertiser can be stored under traffic to ad network location 315.

A search lift related to the advertiser, in this example, the auto dealership, can be detected by monitoring search queries as well as web site traffic. In some implementations, the search lift can be a mathematical function that accounts for the number of impressions based on historical data 305, ad related searches 310, and traffic to network ad locations 315. The search lift due to searches 320 can be the difference between the ad related searches 310 and number of impressions based on historical data 305 related to search queries. Similarly, the search lift due to network location traffic 325 can be the difference between the traffic to ad network location 315 and the number of impressions based on historical data 305. In some implementations, the search lifts 320 and 325 can be associated weights depending on factors including the broadcast radius 225, the search information 230, the searcher information 235, the time when the search lift is calculated, and the like.

For example, if the search query or access to the auto dealership's website is detected from a location within the broadcast radius 225, the search lift due to such access can be associated a high weight. In contrast, if the search query or access is detected from a location outside the broadcast radius 225, the search lift due to such access can be associated a low weight. If the contents of the search query entered at the web page of the search engine are relevant to the advertised products and services, the search lift due to such a search can be associated a high weight. If the relevance of the search query content is low, search lifts due to such a search can be associated a low weight. If the searcher information reveals that the searcher lies within the target audience of the advertiser, search lifts due to such access can be associated a high weight. In this manner, weights can be associated to search lifts based on the broadcast radius 225, the search information 230, and the searcher information 235.

Additionally, weights can also be associated based on when the search lift is calculated. For example, search lifts calculated immediately after the airing of an advertisement can be associated a higher weight than search lifts calculated at a significantly longer duration after the airing of the advertisement. In another example, if an advertisement is aired during peak traffic hours, such as during the morning or evening work commute, listeners may access the internet to search for information related to the advertisement upon reaching their offices or homes. In such instances, search lifts calculated at a significantly longer duration after the airing of the advertisement can be associated a high weight. Search lifts associated with weights can subsequently be converted into a number of impressions by conversion to impressions 335. Conversion to impressions 335 can convert search lifts to impressions using statistical functions, e.g., averaging. The converted impressions can be output to correlation data 250.

Figure 4:
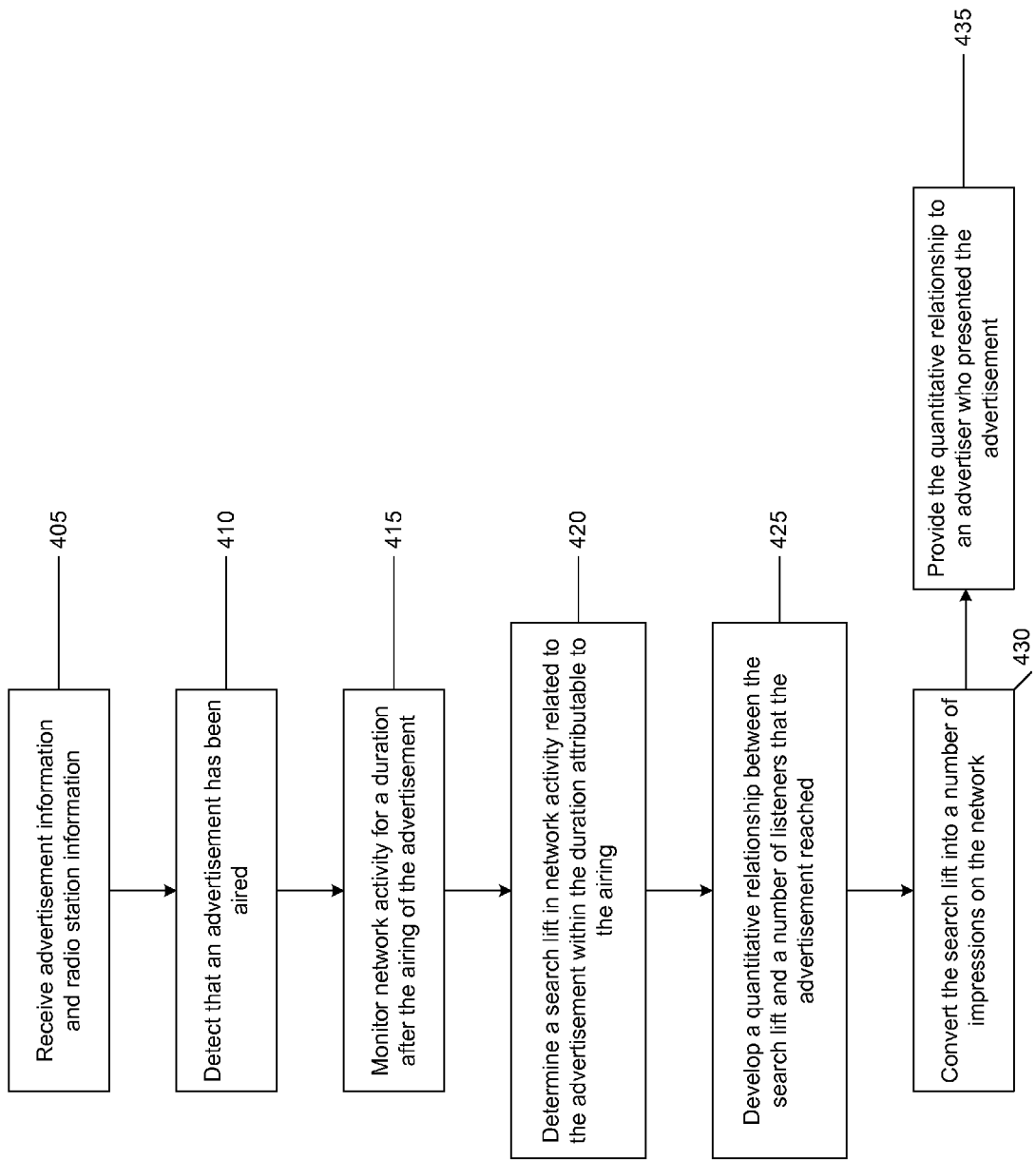
FIG. 4 is a flow chart of a method for enabling an advertiser to determine a return on investment of advertising on a radio station.

FIG. 4 is a flow chart depicting an example of a method for enabling an advertiser to determine a return on investment of advertising on a radio station. The station can be any broadcast station including a radio station and a television station. In some implementations, advertisement information and radio station information are received at 405. The advertisement information can include one or more of advertisement content, metadata related to the advertisement, advertiser information, and the like. The radio station information can include one or more of broadcast radius, the schedule of content to be aired, availability of content aired at other locations including satellite, on the internet, and the like. The advertisement information related to one or more advertisements can be received from one or more advertisers. The radio station information can be received from one or more radio stations. In some implementations, the advertisement information and the radio station information may be shared between the advertisers and the radio stations.

The airing of an advertisement can be detected at 410. In some implementations, the airing can be detected by monitoring the radio station. In other implementations, a schedule for airing advertisements can be received from the advertiser or the radio station. The schedule may be agreed upon by the advertiser and the radio station. Based on information including the schedule for airing the advertisement, the duration of the advertisement, and the like, the airing of the advertisement can be detected.

The network activity can be monitored for a duration after the airing of the advertisement at 415. In some implementations, the network can be the internet. The network can be monitored for activity related to the content of the advertisement. The activity can include searches on internet search engines related to the content of the advertisement. The relevance of internet searches to the advertisement can be determined by methods including comparing search queries entered at web pages provided by search engines to one or more key words related to the advertisement that can be included in the metadata related to the advertisement. In addition, the activity can include network traffic to web sites related to the content of the advertisement. For example, a listener may visit an advertiser's web site, the URL for which was included in the aired advertisement. Such visits by listeners to the advertisers' web site can be included in the network traffic attributable to the airing of the advertisement.

In some implementations, the network can be monitored specifically for activity within the broadcast radius of the radio station that overlaps the geographical location to which the advertiser wishes to advertise. For example, if an advertisement is designed to target consumers within a city, the network can be monitored for activity within the city. Such activity can be attributed to the airing of the advertisement. The network activity monitoring can show that a listener within the city, having listened to the advertisement on the radio station, searched for information related to the advertisement on the internet. The network can be monitored for activity related to the advertisement for a duration starting immediately after the airing of the advertisement and ending at a time that can be specified by the advertiser, specified by the radio station, or determined statistically.

A search lift in network activity related to the advertisement within the duration attributable to the airing of the advertisement can be determined at 420. Statistical monitoring of searches over a range of topics and network traffic collected over time can indicate a level of network activity related to the type of product being advertised. The network activity can include searches on search engines related to the type of product being advertised and traffic to web sites known to include information related to the type of product. Such statistical monitoring may indicate a level of network activity for a given topic at a given time of the year. The level can be one of a frequency, a number of impressions, and the like. When an advertisement related to a topic is aired on the radio station, a surge in network activity within a duration after the advertisement was aired can be detected. For example, listeners having listened to the advertisement may either search for content presented in the advertisement, visit web sites presented in the advertisement, or both. Such a surge can be attributed to the presenting of the advertisement. The search lift can represent the surge in network activity due to the airing of the advertisement over historically collected and statistically monitored data.

A quantitative relationship can be developed between the search lift and a number of listeners that the advertisement reached at 425. In some implementations, the quantitative relationship can include the difference between the number of searches detected upon airing the advertisement and the statistical data collected over previous years. The quantitative relationship can additionally include the difference between the number of hits on an advertiser's web site subsequent to the airing of the advertisement and the statistical data of traffic to the advertiser's website collected over previous years. Further, the search lift can be associated weights based on information related to the type of search detected at the network, the searcher of the information, the location where the search was detected, and the like.

Statistical functions can be employed to combine the search lift and the associated weights to convert the search lift into a number of impressions on the network at 430. The number of impressions can represent a number of listeners who accessed the network to obtain information about the advertised product upon listening to the advertisement aired on the radio station.

The developed quantitative relationship can be provided to an advertiser who presented the advertisement at 435. The relationship can enable an advertiser to determine the return on the investment of airing the advertisement at a time slot on a radio station. In addition, the relationship can be provided to the radio station airing the advertisement. The radio station can determine the value of the time slot when the advertisement was aired.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, in some implementations, the correlation engine 105 can include a prediction system 505 (FIG. 5). The prediction system 505 can receive input from one or more sources including correlation data 505, data from the correlation determining system 245, data from historical data 240. Based on the received information, the prediction system 505 can predict a number of impressions that will be generated the next time the same advertisement is aired by the same radio station. In addition, the prediction system 505 can predict a number of impressions that will be generated if the advertisement is presented at a different radio station. The prediction system 505 can employ statistical functions, e.g., weighted averages, to calculate the predicted values.

In some implementations, the availability of content aired by a radio station on the internet can add weight to the search lift data. For example, a radio station can reach a larger audience if the content aired on the radio can be simultaneously transmitted over the internet. Network traffic on an advertiser's web site subsequent to the airing of an advertisement from users whose location is determined to be outside the broadcast radius of the radio station can be associated a weight and included in the quantitative relationship determination.

In some implementations, the search lift can be manifested by an increase in the network traffic to the radio station's web site subsequent to airing the advertisement. The surge in network traffic to a radio station's web site subsequent to the airing of an advertisement can be associated a weight and included in the quantitative relationship determination.

In some implementations, advertisers may advertise products and services in several markets in several geographic regions, e.g., nation wide, through several radio stations. The correlation data can be obtained from each radio station having a broadcast radius spanning a different geographic region. The correlation data from different geographic regions can be provided to the advertiser. In addition, advertiser's can also be presented with competitors' correlation data. A comparison of an advertiser's correlation data and a competitor's correlation data can be performed. Based on the quantitative results obtained from the comparison, suggestions can be provided to the advertiser to improve marketing in geographic regions where a competitor may hold a greater market share.

In some implementations, the information gathered by the CDS 245 including the correlation data 250 can be provided to the user, e.g., in the form of a report. The report can include metrics and associated calculations, including graphs, that represent the correlation data 250, the number of impressions generated by airing the advertisement, and the like. The correlation data 250, that represents an effectiveness of airing an advertisement, includes correlation of analytics data to advertisement campaigns, correlation of search lift to advertisement campaigns, correlation of call tracking/reporting to the advertisement campaigns, and the like. This correlation data 250 will be provided to an advertiser who wishes to identify an effectiveness of airing an advertisement during one or more time slots and to identify a return on investment on the advertisement campaign.

In some implementations, an advertiser 115 can access the correlation engine 105 using a computer system, e.g., a desktop computer, a laptop computer, a PDA, and the like. The correlation engine 105 provides a setup screen displayed on the advertiser's computer system into which the advertiser 115 can input advertisement information 205. Upon generating the correlation data 250, the correlation engine 105 can display the report including the correlation data 250 on the display device of the advertiser's computer system. To enable the correlation engine 105 to create the report including the correlation data 250, the advertiser 115 can choose to provide the correlation engine 105, access the advertisement information 205. Subsequently, the advertiser 115 can input the advertisement information 205 using the set up screen. The correlation engine 105 can then determine the correlation data 250 and provide a report that can be viewed for the entire campaign or by separate markets where the advertisement was aired or both. The report can include sections describing campaign performance, correlation of analytics data, correlation of call tracking, correlation of search lift, and the like. The report can be detailed with graphs that overlay advertisement campaign performance to correlation metrics.

The first time an advertiser accesses a report, the correlation engine 105 can check to see if an account including the advertiser's information exists and if such account is associated with the advertiser. If such an account does not exist, the correlation engine 105 can provide a message to the advertiser 115 to create an account, so that the report including the correlation data 250 can be provided to the advertiser. In addition, instructions on creating an account can also be provided to the advertiser. For example, instructions on creating an account on a web site related to the correlation engine 105 can be provided to the advertiser 115.

The advertiser 115 can be provided with a setup screen including three sections, namely, an analytics section, a call tracking section, and a keywords section. The set-up screen can be used to gather advertisement information 205 about the advertisement, the advertiser, and the like. For example, in the analytics section, the advertiser can specify that the advertisement includes a URL. In some implementations, subsequent to airing an advertisement, the correlation engine 105 can be operatively coupled to telephone lines to monitor and determine a number of phone calls received regarding the advertised products and services. In the call tracking section, the advertiser can specify if the advertiser is employing a mechanism to track phone calls or if the advertiser wishes to employ the correlation engine's mechanism for the same or if the advertiser wishes to use both. In the keywords section, the advertiser can specify from lists of keywords, e.g., four lists of keywords, keywords associated with the advertiser, keywords associated with the advertisement, and the like. In some implementations, the list of keywords can be generated using the content of advertisement. Examples of keyword lists also include the industry that the advertisement targets, competitors, and the like.

The report provided to the advertiser can contain sections with key metrics that can be viewed for all markets where the advertisement is aired or for one or more individual markets where the advertisement is aired. The metrics can include audio metrics and print metrics, where the audio metrics representing a campaign performance include dates of airing the advertisement, number of times the advertisement was played, number of stations where the advertisement was played, number of markets, number of unique listeners that heard the advertisement, number of times the unique listeners heard the advertisements, and the like. Print metrics represent hard copies where the advertisement was displayed, e.g., in newspapers, magazines, and the like, and can include dates when the advertisement was displayed, the size of the displayed advertisement, sections of newspapers where the ad was placed, frequency of insertions, circulation of newspapers, and the like.

For advertisements aired on the radio, play data, list of stations, and market information can be obtained from the data mart. Information related to a number of listeners and a frequency at which the listeners heard the advertisement can be obtained by inventory management systems (IMS), e.g., for each market and for every week that the advertisement was aired. The correlation determining system 245 can take the greatest number of listeners that heard an advertisement over a period of several weeks for each market, and calculate a sum for all the markets. A frequency of listeners who heard the advertisement can be obtained for each week, and an average frequency can be calculated. For example, for the period between May 1 and May 30, an advertisement that was played 10,000 times on 100 stations across 100 markets averaged 100,000 unique listeners who heard the advertisement at an average of 3 times per week.

The metrics in the correlation of analytics data in the report include metrics generated when user's access a web page of a web site in response to listening to an advertisement on the radio. The metrics include a number of unique visitors, a number of times a web page is viewed, percentage lift of visitors compared to baseline prior to airing an advertisement, percentage lift of number of times a page is viewed compared to baseline prior to airing the advertisement, percentage lift of uniform resource locator (URL) referrals compared to baseline prior to campaign, if applicable, i.e., the number of people who went directly to the URL specified in the advertisement, ratio of number of listeners to number of visitors, and the like. The baseline for both unique visitors and number of times a page is viewed can be calculated using the average of the four weeks prior to when the advertisement was aired to the date when the advertisement was first aired. Percentage lift can be calculated by calculating a difference between baseline and the average of the metrics during when the advertisement aired, and dividing the difference by the baseline. The ratio of number of listeners can be determined by dividing the number of unique visitors by the number of unique listeners for a period of one week. For example, it can be determined that during the time when the advertisement was aired, a 25% increase in the number of visitors and a 30% increase in the number of times an advertiser's web page was viewed was calculated, and that one of every 100 listeners who heard the advertiser's advertisement visited the advertiser's website.

The report can include correlation of call tracking/reporting where the metrics include a number of calls to a telephone number mentioned in the advertisement, and a ratio of number of listeners to unique phone numbers. For example, it can be calculated that, a total of 500 telephone calls were received during the time when the advertisement aired, and that one out of every 1000 listeners who heard the advertisement called the phone number mentioned in the advertisement. The report can include correlation of search lift where the metrics can include percentage lift of advertiser related keywords, percentage lift of advertisement information related keywords, and the like. The search queries related to an advertiser or the advertisement or both can be normalized by the total volume of queries, the industry terms, competitors, and the like. For example, it can be determined that when the advertisement was aired, a 10% increase in searches on keywords related to the advertiser's brand name was observed, and that a 5% increase in searches on keywords related to the content of the advertisement was observed. Accordingly, other implementations are within the scope of the following claims.

What is claimed is:

1. A method performed by data processing apparatus, the method comprising:
   detecting that an advertisement has been aired by a broadcast station;
   monitoring a network for a duration subsequent to the airing of the advertisement;
   detecting, by the data processing apparatus, network activity attributable to the airing of the advertisement;
   determining a number of network activities related to content of the advertisement on the network within the duration;
   comparing the determined number of network activities within the duration with a previous number of network activities related to the content of the advertisement prior to the duration;
   determining an increase in the number of network activities within the duration over the previous number of network activities prior to the duration;
   attributing the increase in the number of network activities to the airing of the advertisement;
   determining a number of impressions generated by the airing of the advertisement based on the increase in the number of network activities;
   determining a correlation between the number of impressions and the increase in the number of network activities; and
   using the correlation to predict one of an increase in a number of network activities attributable to a subsequent airing of the advertisement or a number of impressions generated by the subsequent airing of the advertisement.

2. The method of claim 1, wherein the number of network activities comprises at least one of a number of network searches related to the content of the advertisement or a number of accesses of a network location related to the advertisement.

3. The method of claim 1, further comprising developing a relationship between the increase in the number of network activities and a number of listeners of the advertisement.

4. The method of claim 3, further comprising providing the developed relationship to an advertiser for determining a return of investment of the airing of the advertisement.

5. The method of claim 3, further comprising providing the developed relationship to the broadcast station for determining a value of an advertisement slot when the advertisement was aired.

6. The method of claim 1, wherein determining the number of impressions comprises converting the increase in the number of network activities into the number of impressions.

7. The method of claim 6, wherein the number of impressions represents a number of listeners who accessed the network in response to the airing of the advertisement.

8. The method of claim 7, wherein an impression comprises a hit on a web page that includes information about the advertisement, a search on the network for information about the advertisement, or both.

9. The method of claim 1, further comprising:
receiving
  (a) information related to the advertisement, and
  (b) information related to a broadcast station airing the advertisement.

10. The method of claim 9, wherein the information related to the advertisement comprises at least one of advertisement content or advertisement metadata.

11. The method of claim 10, wherein the advertisement metadata comprises at least one of a type of the advertisement content, a target audience, or preferred air times.

12. The method of claim 9, wherein the information related to the broadcast station comprises at least one of a theme of content aired at the broadcast station, time slots for presenting advertisements, schedule of content aired at the broadcast station, or a broadcast radius.

13. The method of claim 1, wherein monitoring the network for activity comprises:
matching content of a search query entered at a network location with content of the aired advertisement; and
monitoring access to a network location that includes content relevant to the advertisement.

14. The method of claim 1, wherein the duration is based on at least one of a duration of the advertisement, a predetermined duration, a duration specified by an advertiser of the advertisement, a duration specified by the broadcast station, a duration determined by a decreasing number of the increase in the number of network activities, or a duration determined based on the increase in the number of network activities being zero.

15. The method of claim 1, wherein determining the number of impressions comprises associating a weight to the detected network activity based on relevance of content associated with the detected network activity to the advertisement.

16. The method of claim 1, wherein determining the number of impressions comprises associating a weight to the detected network activity based on a time when the network activity is detected.

17. The method of claim 1, wherein determining the number of impressions comprises converting the increase in the number of network activities into the number of impressions using statistical functions.

18. A system comprising:
one or more computer systems and one or more storage devices storing instructions that are operable, when executed by the one or more computer systems, to cause the one or more computer systems to perform operations comprising:
detecting that an advertisement has been aired by a broadcast station;
monitoring a network for a duration subsequent to the airing of the advertisement;
detecting network activity attributable to the airing of the advertisement;
determining a number of network activities related to content of the advertisement on the network within the duration;
comparing the determined number of network activities within the duration with a previous number of network activities related to the content of the advertisement prior to the duration;
determining an increase in the number of network activities within the duration over the previous number of network activities prior to the duration;
attributing the increase in the number of network activities to the airing of the advertisement;
determining a number of impressions generated by the airing of the advertisement based on the increase in the number of network activities;
determining a correlation between the number of impressions and the increase in the number of network activities; and
using the correlation to predict one of an increase in a number of network activities attributable to a subsequent airing of the advertisement or a number of impressions generated by the subsequent airing of the advertisement.

19. The system of claim 18, wherein the number of network activities comprise at least one of a number of network searches related to the content of the advertisement or a number of accesses of a network location related to the advertisement.

20. The system of claim 18, wherein the operations further comprise developing a relationship between the increase in the number of network activities and a number of listeners of the advertisement.

21. The system of claim 18, wherein determining the number of impressions comprises converting the increase in the number of network activities into the number of impressions.

22. The system of claim 18, wherein the operations further comprise:
receiving (a) information related to the advertisement, and
  (b) information related to a broadcast station airing the advertisement.

23. The system of claim 22, wherein the information related to the advertisement comprises at least one of advertisement content or advertisement metadata.

24. The system of claim 22, wherein the information related to the broadcast station comprises at least one of a theme of content aired at the broadcast station, time slots for presenting advertisements, schedule of content aired at the broadcast station, or a broadcast radius.

25. The system of claim 18, wherein the operation of monitoring the network for activity comprises:
matching content of a search query entered at a network location with content of the aired advertisement; and
monitoring access to a network location that includes content relevant to the advertisement.

26. A computer-readable medium having instructions stored thereon, the instructions operable to cause one or more computing devices to perform operations comprising:
detecting that an advertisement has been aired by a broadcast station;
monitoring a network for a duration subsequent to the airing of the advertisement;
detecting network activity attributable to the airing of the advertisement;
determining a number of network activities related to content of the advertisement on the network within the duration;
comparing the determined number of network activities within the duration with a previous number of network activities related to the content of the advertisement prior to the duration;
determining an increase in the number of network activities within the duration over the previous number of network activities prior to the duration;
attributing the increase in the number of network activities to the airing of the advertisement;
determining a number of impressions generated by the airing of the advertisement based on the increase in the number of network activities;

determining a correlation between the number of impressions and the increase in the number of network activities; and using the correlation to predict one of an increase in a number of network activities attributable to a subsequent airing of the advertisement or a number of impressions generated by the subsequent airing of the advertisement.

27. The computer-readable medium of claim 26, wherein the operations further comprise developing a relationship between the increase in the number of network activities and a number of listeners of the advertisement.

28. The computer-readable medium of claim 26, wherein determining the number of impressions comprises converting the increase in the number of network activities into the number of impressions.

29. The computer-readable medium of claim 26, wherein the operations further comprise:
receiving
  (a) information related to the advertisement, and
  (b) information related to a broadcast station airing the advertisement.

30. The computer-readable medium of claim 26, wherein the operation of monitoring the network for activity comprises:
matching content of a search query entered at a network location with content of the aired advertisement; and
monitoring access to a network location that includes content relevant to the advertisement.

* * * * *